Apr. 24, 1923.
A. B. SNYDER
1,452,663
RECORDING DEVICE FOR LIQUID PUMPS
Filed Oct. 20, 1921
2 Sheets-Sheet 1
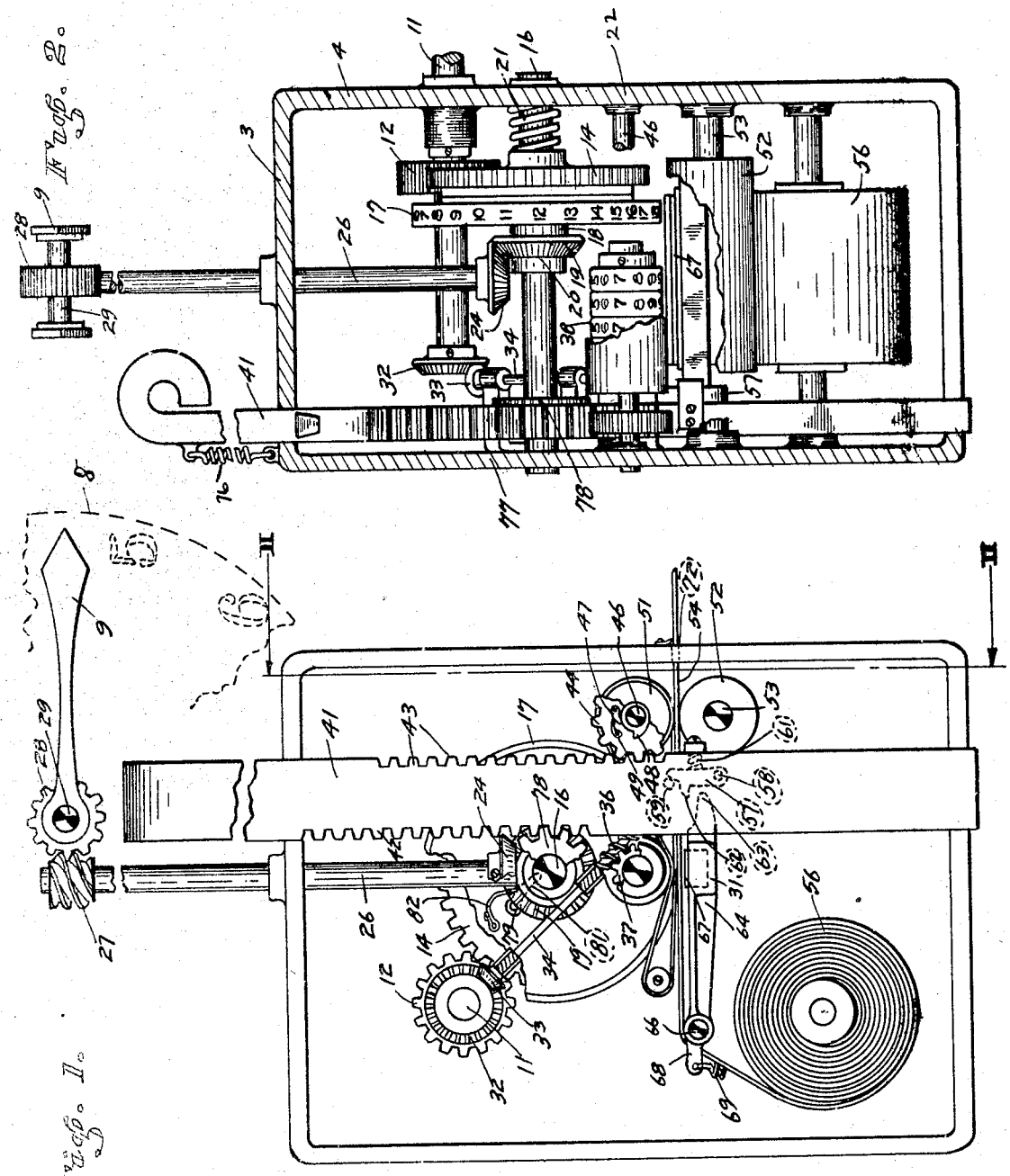
Inventor.
A. B. SNYDER.
Attorneys.

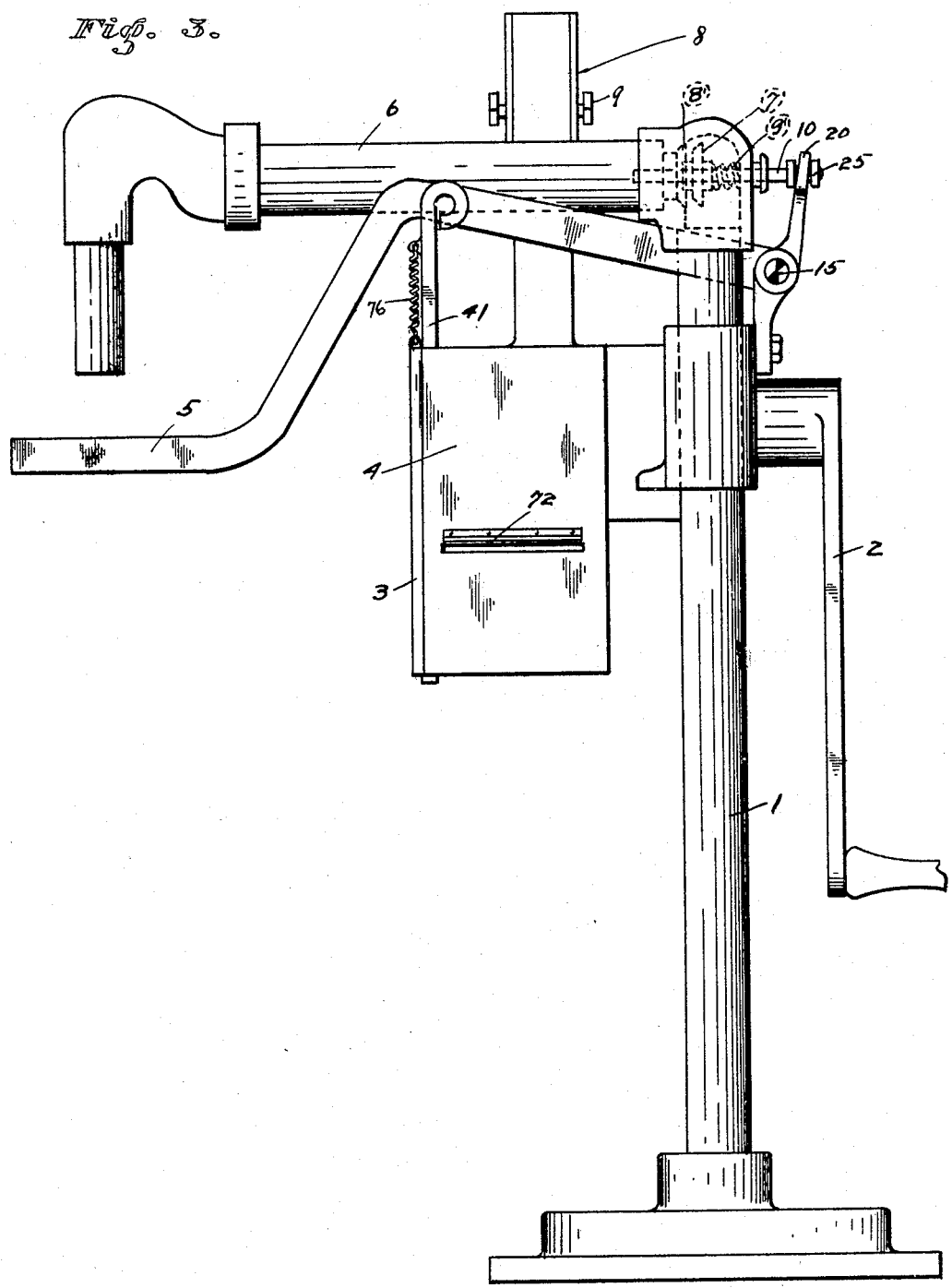

Patented Apr. 24, 1923.

1,452,663

UNITED STATES PATENT OFFICE.

ATHERTON B. SNYDER, OF GRASS VALLEY, CALIFORNIA.

RECORDING DEVICE FOR LIQUID PUMPS.

Application filed October 20, 1921. Serial No. 508,952.

*To all whom it may concern:*

Be it known that I, ATHERTON B. SNYDER, a citizen of the United States, and resident of Grass Valley, county of Nevada, and State of California, have invented a new and useful Recording Device for Liquid Pumps, of which the following is a specification.

The present invention relates to improvements in recording devices for liquid pumps and is designed with particular reference to oil dispensing pumps such as are commonly used in garages and automobile supply stations. Particular attention is called in this connection to my co-pending application Serial No. 508,951 which describes a similar recording device for gasoline dispensing pumps, the principal difference between the two devices being that in gasoline dispensing pumps a hose is commonly used as a dispensing means while in oil dispensing pumps it is common to use a faucet for the same purpose. Since my device in both cases is closely associated with the particular dispensing means and is so constructed that the latter cannot be properly used without causing a record to be made of the quantity withdrawn, it became necessary to provide two different recording devices, one being adapted to co-operate with the hose used as dispensing means while the other described in the present application is adapted to be used in co-operation with the faucet.

As stated in my co-pending application the particular object of my invention is to provide a recording device that will eliminate any of the mistakes or errors commonly made by the operator which consist principally in the failure to properly record all the scales made.

With these objects in view I have illustrated the preferred form of my invention in the accompanying drawing, in which Figure 1 represents a side view of my recording device, the cover being removed so as to disclose the interior; Figure 2 a vertical cross section through the device along line 2—2 of Figure 1, and Figure 3 an assembly side elevation of the oil pump as commonly used with my recording device attached thereto. It will be understood that I do not wish to confine my device to oil pumps as such but wish to be protected on the same in connection with any liquid dispensing pump adapted to be used in connection with the same.

Figure 3 shows the oil dispensing pump (1) as commonly used in oil dispensing stations. The same is actuated in a well known manner not shown in the drawing by means of the handle (2). My recording device (3) included in the box (4) is attached to the side of the pump as shown in Figure 3. The discharge pipe (6) of the pump is controlled by the valve (7) normally forced against the valve seat (8') by the spring (9') surrounding the valve rod (10). The valve is actuated by a bell crank lever (5) pivotally supported on the pump as shown at (15) and having a forked end (20) engaging the end of the valve rod between two collars (25). The other arm of the lever (5) extends to within close proximity with the outlet of the faucet and supports in a central portion the bar (41) which co-operates with the pumping mechanism in actuating my recording device and which will be referred to more particularly hereafter. Suffice it to say at the present time that the raising of the free end of the lever (5) opens the valve (7) and simultaneously causes the bar (41) to move upwardly against the resistance of the spring (76) secured between the bar (41) and the side (77) of the box (4), while the release of the free end of the lever (5) closes the valve and causes the bar (41) to move downwardly under the influence of the spring (76). The free end of the lever (5) is raised by the operator when he wishes to withdraw oil, by striking the same from below with the oil receiving receptacle.

The detail construction of the recording mechanism is shown in Figures 1 and 2 from which it will be seen that the principal actuating means for the recording device is the shaft (11) which is connected either directly or through a train of gears, not shown in the drawing, to the handle (2) so that whenever the handle (2) is operated the shaft (11) will rotate in a predetermined manner. The shaft (11) has keyed thereto a pinion (12) which engages a gear wheel (14) loosely mounted on the shaft (16) extending parallel to the shaft (11) and supported in the walls of the box (4). The shaft (16) has also loosely mounted thereon the recording wheel (17), the rim of which is graduated, as shown in Figure 2, and which forms an integral part of the sleeve (18) carrying the bevel gear (19) bearing against the collar (20) rigidly secured to the shaft (16). A spring (21) wound on the shaft (16) and extending between the wall (22) of the box (4) and the gear wheel (14) presses the latter gear wheel into operative contact with the recording wheel (17). This contact is sufficiently intense to transmit rotary motion from the gear wheel (14) to the recording wheel (17) and the bevel gear (19), but is not sufficient to transmit motion the opposite way so that the gear wheel (14) will turn the recording wheel (17), but the latter will not turn the former on account of its heavier load. The particular object of this arrangement will appear as the description proceeds. The bevel gear (19) engages a second bevel gear (24) at the lower end of the vertical shaft (26) extending through the top of the box and ending into a worm (27) engaging the worm gear (28) mounted on the transverse shaft (29) which latter shaft carries the hands (9) of the dial (8). It will be seen that in the device thus far described a turning of the handle (2) will cause the recording wheel (17) to rotate so as to bring a figure corresponding to the quantity of oil withdrawn into operative proximity with the printing device (31) hereinafter described and will also cause the hand (9) to move over the dial (8) to a corresponding figure. The shaft (11) carries at its end the bevel gear (32) which engages a pinion (33) at the end of a shaft (34). The latter is provided with a worm (36) engaging a worm gear (37) which is operatively associated with the recording device (38). The latter is used in my device to indicate the total oil withdrawn and is constructed along well known lines, and therefore not described in detail, it being sufficient to state that the recording device (38) brings a figure corresponding to the total oil withdrawn in operative proximity with the printing device (31) at the same time that the recording wheel (17) brings the figure indicating the quantity of oil withdrawn during the last operation into the same relation with the printing device. Thus after a quantity of oil has been withdrawn we find the hand on the dial indicating the oil withdrawn during the last operation, the wheel (17) bringing the same figure and the recording machine (38) the total figure opposite the printing device.

After the operator has withdrawn the desired amount of oil he releases the lever (5), which is shown as pivotally supporting the vertical bar (41) extending through the box and provided with teeth (42) and (43) at two opposing sides. The teeth (43) engage a cog wheel (44) loosely mounted on the shaft (46) and provided with a pawl (47) adapted to engage a cam (48) rigidly secured to the shaft (46), the spring (49) holding the pawl in contact with the cam. It will be noticed from Figure 1 that when the bar (41) is in its uppermost position, that is, in the position it occupies when held by the operator, the pawl (47) is out of engagement with the cam (48) and that the cog wheel (44) has to rotate through about one-fourth of a turn before the pawl engages the cam. The shaft (46) carries the drum (51) with which is operatively associated a second drum (52) idling on the shaft (53) so that the strip of paper (54) emanating from the roll (56) may be received between the two drums and advance when the drums rotate. The bar (41) is also provided with a dog (57) pivoting on the pin (58), the position of the dog being defined by the stop (59) and the spring (61) forcing the extreme end of the dog against the stop. On the downward travel of the bar (41) the point (62) of the dog (57) engages the point (63) of the printer (31) which comprises a lever (64) pivoting on the shaft (66) and carrying a transverse printing hammer (67) disposed in operative relation to the single recording wheel (17) as well as the total recording machine (38). The other arm (68) of the lever (64) is connected by the spring (69) to a suitable stationary support. When the lever (5) is released it forces the bar (41) downwardly, the teeth (43) engaging and rotating the cog wheel (44) while the dog (57) engages the printing lever (64). It will be remembered that the cog wheel (44) is inoperative during the first quarter of its turn so that the dog (57) can force the printing lever (64) downward against the resistance of the spring (69) until through the changed position of the lever (64) the dog loses its hold on the lever and the latter is violently thrown against the two recording wheels (17) and (38) and the strip of paper (54) interposed between the recording wheels and the printing lever so that the figures on the wheels indicating the record to be made are printed on the paper. When this is done the pawl (47) engages the cam (48) so that the cog wheel (44) begins to rotate the shaft (46) and with it the drum (51), which through its cooperation with the drum (52) pulls the paper forward and pushes the record previously made through the slot (72) in the side of the box where the same may be manually separated from the strip (54). It will be seen that this last operation has not changed the position of the recording wheels nor that of the hand on the dial so that the latter still indicates the amount of gasoline withdrawn during the last operation. This situation is not changed until the lever (5) is raised again over the resistance of the spring (76).

The teeth (42) of the bar engage the cog wheel (78) rigidly secured on the shaft (16). It will be remembered that the recording wheel (17) is mounted loosely on the shaft (16) so that normally the rotation of the shaft (16) does not affect the recording wheel (17). On the downward motion of the bar (41) therefore although the shaft (16) was rotated by the cog wheel (78) the recording wheel (17) remained in its position; but on the upward motion of the bar (41) the rotation of the cog wheel (78) and the shaft (16) is transmitted to the recording wheel (17) by means of the pawl (79) pivotally secured on the side of the recording wheel (17) engaging a co-operating recess (81) in the shaft (16), the spring (82) forcing the pawl into engagement with the recess. In this manner the recording wheel (17) which was advanced from zero to a figure corresponding to the quantity of oil withdrawn during the last operation is now further advanced so as to go back to zero. As has been previously remarked, the recording wheel (17) is connected with the gear wheel (14) in such a manner as to allow of rotary motion of the recording wheel independently of the gear wheel (14). The advance of the recording wheel (17) to zero is transmitted to the hand on the dial by means of the bevel gears (19) and (24), the shaft (26), the worm (27) and the gear (28) so that when the lever (5) is raised the recording wheel (17) as well as the hand (9) on the dial are advanced to zero, while the total recording machine (38) remains unaffected.

Briefly stated, the apparatus works as follows: Upon turning the handle (2) which actuates the pumping mechanism the shaft (11) is actuated to rotate and to turn the gear wheel (14) and through it the recording wheel (17). Assuming that the shaft (11) is turned counter-clockwise looking at it from the right side in Figure 2, the recording wheel (17) is turned clockwise and a certain figure, say 5, is brought opposite the printing device. Simultaneously the hand on the dial has been moved to indicate the figure 5 on the latter through the gear train described hereinabove, while simultaneously the figure 5 has been added to the total figure indicated on the total recording device (38). Releasing the lever (5) which is pressed upward by the operator during the dispensing operation; causes the bar (41) to slide downwardly to actuate the printing lever (31) by means of the dog (57) and to pull the strip of paper (54) forward so as to expose the printed record outside of the box for manual removal. During this operation the shaft (16) has been rotated in counter-clockwise direction without affecting the recording wheel (17) since the recess (81) in the shaft (16) does not engage the pawl (79) on a counter-clockwise rotation. The next step is the raising of the lever (5) for the withdrawal of a new quantity of oil which causes the bar (41) to slide upwardly thereby rotating the shaft (16) in a clockwise direction. On this motion the shaft engages the pawl (79) as soon as the recess (81) reaches the point of the pawl and then turns the recording wheel (17) into its original position by advancing the same in the same direction in which it was originally rotated: that is, if the recording wheel is graduated for 25 units and 5 units are withdrawn the recording wheel would move during the original withdrawal from 1 to 5, and upon the raising of the lever (5) at the time of the next withdrawal from 5 through the remaining figures to 25 or its point of commencement. The hand on the dial moves in exactly the same manner as the recording wheel. It will be noted that due to the construction of the dial the hand cannot be turned in either direction manually since the worm gear is employed for its operation. Thus whenever the hand on the dial indicates any other figure than zero there is only one way of returning it to zero and that is by releasing the lever (5) and raising it again. As we have seen, the releasing of the lever causes the record to be printed on the strip of paper so that when the hand on the dial indicates any figure except zero it cannot be returned to zero except after the record has been properly printed on the strip of paper. It will be readily understood that instead of one strip of paper two strips may be introduced so as to provide an extra copy for the customer.

I claim:

1. A recording device for a machine dispensing liquid through a faucet comprising a valve for the faucet, a control lever for the valve extending within operative proximity of the mouth of the faucet tending to normally close it but adapted to open it when struck by the receptacle receiving the oil, a recording wheel, means actuated by the dispensing mechanism for disposing the wheel in an active position and means actuated by the control lever for causing the record to be printed when the lever closes the valve and for returning the recording wheel to its initial position when it opens the valve.

2. A recording device for a machine dispensing liquid through a faucet comprising a valve for the faucet, a control lever for the valve extending within operative proximity of the mouth of the faucet tending to normally close it but adapted to open it when struck by the receptacle receiving the oil, a recording wheel and an indicating dial, means actuated by the dispensing mechanism for disposing the wheel and the dial in an active position and means actuated by the control lever for causing the record to be printed when the lever closes the valve and for returning the recording wheel and the dial to their initial positions when it opens the valve.

3. A recording device of a machine dispensing liquid through a faucet comprising a valve for the faucet, a control lever for the valve extending within operative proximity of the mouth of the faucet tending to normally close it but adapted to open it when struck by the receptacle receiving the oil, a single recording wheel and a set of total recording wheels, means actuated by the dispensing mechanism for disposing the wheels in an active position and means actuated by the control lever for causing the records to be printed when the lever closes the valve and for returning the single recording wheel to its initial position when it opens the valve.

4. A recording device for a machine dispensing liquid through a faucet comprising a valve for the faucet, a control lever for the valve extending within operative proximity of the mouth of the faucet tending to normally close it but adapted to open it when struck by the receptacle receiving the oil, a single recording wheel, a set of total recording wheels, and an indicating dial, means actuated by the dispensing mechanism for disposing the recording wheels and the dial hand in an active position and means actuated by the control lever for causing the records to be printed when the lever closes the valve and for returning the single recording wheel and the dial hand to their initial position when it opens the valve.

ATHERTON B. SNYDER.